J. S. THURMAN.
COMBINED DISINFECTING AND GREASE REMOVING APPARATUS.
APPLICATION FILED FEB. 18, 1908.

918,931.

Patented Apr. 20, 1909.
2 SHEETS—SHEET 1.

Attest.
Edgar T. Farmer.
M. P. Smith.

Inventor:—
John S. Thurman
By Higdon Longan
attys.

J. S. THURMAN.
COMBINED DISINFECTING AND GREASE REMOVING APPARATUS.
APPLICATION FILED FEB. 18, 1908.
918,931.
Patented Apr. 20, 1909.
2 SHEETS—SHEET 2.
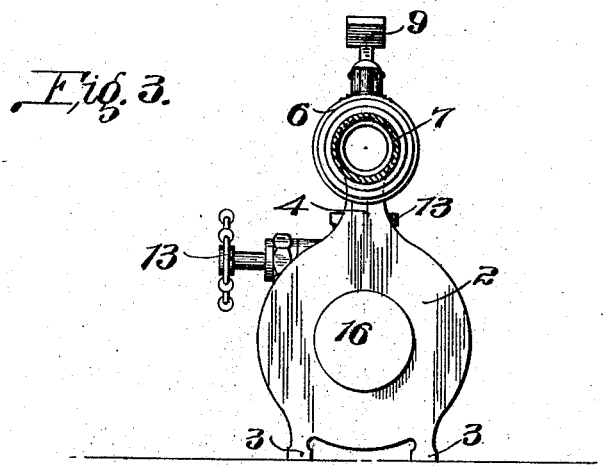
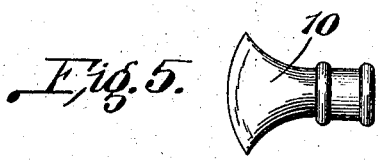
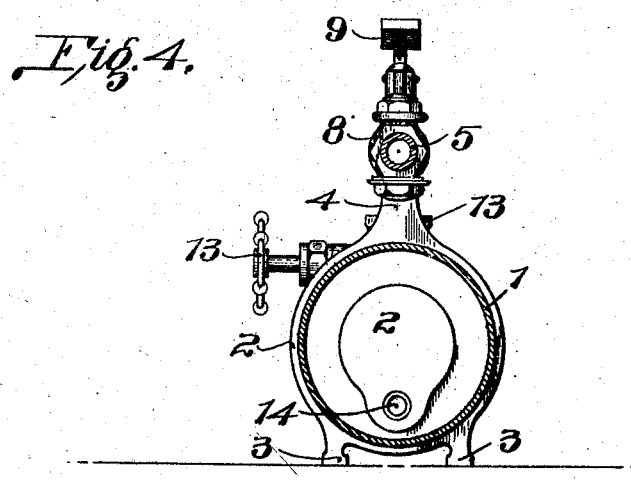
Attest.
Edgar T. Farmer
M. P. Smith
Inventor:—
John S. Thurman,
By Higdon Longan.
Attys.

UNITED STATES PATENT OFFICE.

JOHN STROTHER THURMAN, OF ST. LOUIS, MISSOURI.

COMBINED DISINFECTING AND GREASE-REMOVING APPARATUS.

No. 918,931.   Specification of Letters Patent.   Patented April 20, 1909.

Application filed February 18, 1908. Serial No. 416,628.

*To all whom it may concern:*

Be it known that I, JOHN S. THURMAN, a citizen of the United States, and resident of St. Louis, Missouri, have invented certain new and useful Improvements in a Combined Disinfecting and Grease-Removing Apparatus, of which the following is a specification containing a full, clear, and exact desciption, reference being had to the accompanying drawings, forming a part hereof.

My invention relates to an apparatus or tool for distributing a liquid or powdered disinfectant by the use of compressed air, and said tool being so adapted to be used in the removal of grease spots and the like from carpets, curtains, upholstering, and the like.

The object of my invention is to provide a simple, inexpensive apparatus comprising a container for the liquid or powdered disinfectant, insect exterminator, or soapsuds, and which device is readily attached to a flexible compressed air conveying tube; and there being valves conveniently located for controlling the passage of compressed air through the device, and also the discharge of the disinfectant or soapsuds therefrom.

To the above purposes, my invention consists in certain novel features of construction and arrangement of parts, which will be hereinafter more fully set forth, pointed out in the claim, and illustrated in the accompanying drawings, in which:—

Figure 1:
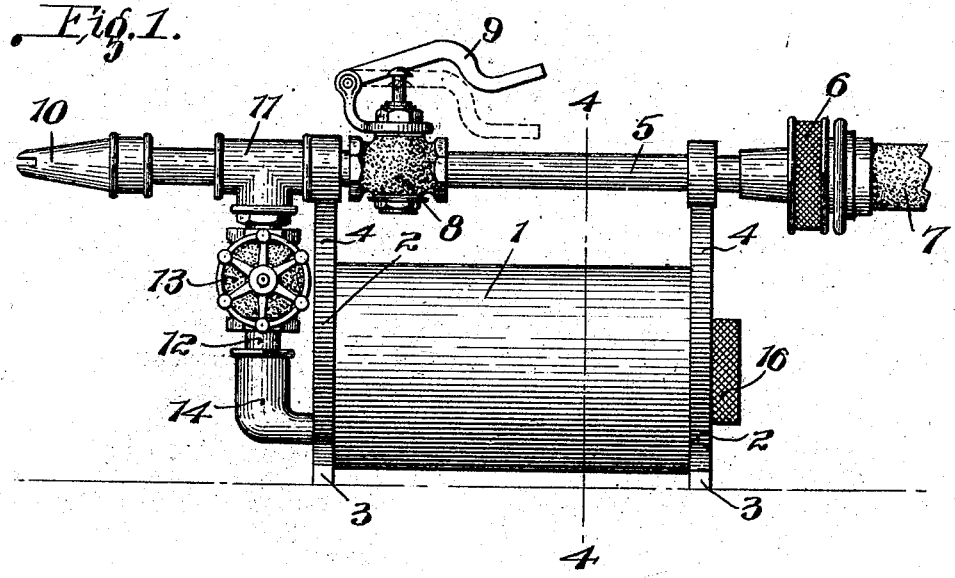
Figure 2:
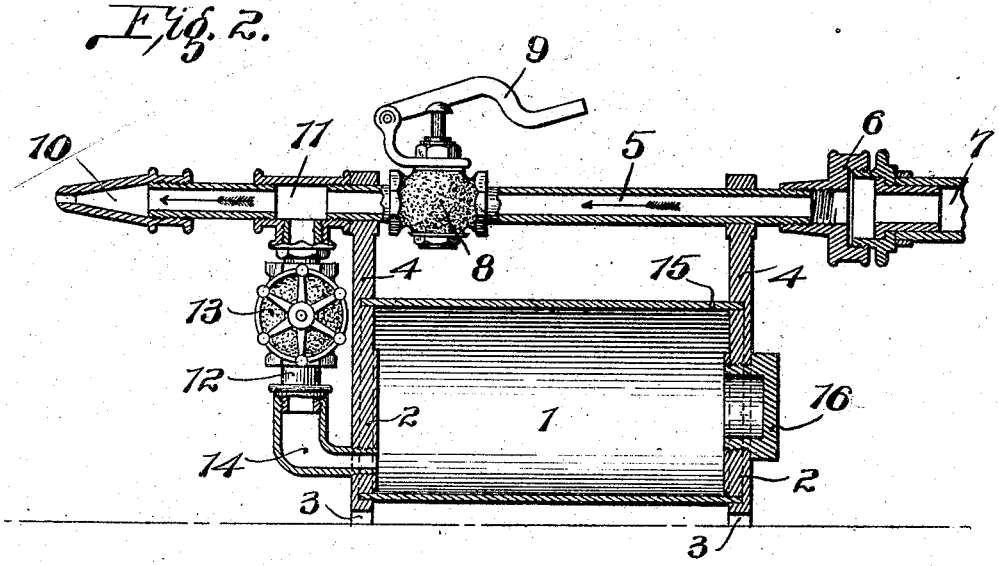

Figure 1 is a side elevation of an apparatus of my improved construction; Fig. 2 is a vertical section taken lengthwise through the center of the apparatus; Fig. 3 is a rear elevation of the apparatus; Fig. 4 is a vertical section taken on the line 4—4 of Fig. 1; and Fig. 5 is a plan view of the spray nozzle used in connection with the apparatus.

Referring by numerals to the accompanying drawings:—1 designates the container or body of the apparatus, which is in the form of a hollow cylinder, closed at the ends by the plates 2, in the lower portions of which are formed feet 3, which support the apparatus when not in use; and formed integral with the upper portions of said plates are brackets 4, in which is arranged a longitudinally disposed pipe 5, the rear end of which is provided with a suitable coupling 6, by means of which the apparatus is attached to the end of a compressed air pipe 7.

Arranged in the pipe 5 is a self-closing valve 8, provided with an operating handle 9, the end of which occupies a position immediately above the central portion of the pipe 5.

Detachably fixed on the forward end of the pipe 5 is a flat spray nozzle 10, the orifice in which is approximately equal to the interior cross sectional area of the pipe 5 and leading from a T 11, located in the pipe 5 adjacent the front one of the plates 2, is a short vertically disposed pipe 12, in which is located a globe valve 13; and connecting the lower end of said pipe 12 with the lower portion of the container 1 is an elbow 14.

In the top and rear portion of the container 1 is an air inlet aperture 15, and normally closing a screw threaded aperture formed in the rear one of the end plates 2 is a screw plug 16, which, when removed, permits the container to be filled.

When the device is used as a disinfecting apparatus, the container 1 is filled with a suitable liquid or powdered disinfectant, and the compressed air pipe 7 is attached to the rear end of the pipe 5. The operator now manually engages the pipe 5, moving the apparatus to the point desired; and by placing the thumb on the handle 9 and depressing the same, compressed air is allowed to discharge through the tube 5 and out through the nozzle 10. The valve 13 is now slightly opened and adjusted so as to regulate the discharge of liquid or powder through said valve, and the suction resulting from the passage of the air through the pipe 5 draws the liquid or powder through the pipe 12, and said liquid or powder is delivered in the form of spray through the nozzle 10, and is thus forcibly discharged into cracks, crevices, and through fabric, such as carpets, curtains, and upholstery.

The air inlet aperture 15 is provided to permit air to enter the container 1 as the liquid is withdrawn therefrom.

When the device is used as a grease spot remover, the container 1 is filled with soapsuds, or a like cleaning compound, and when the compressed air is permitted to discharge through the pipe 5 and nozzle 10, the soapsuds or cleaning compound is drawn from the container by suction, and discharged directly upon the spot to be removed. If the device is used for the removal of grease spots and the like, the discharging end of the nozzle is held in direct contact with the goods being acted upon, and said nozzle is moved backward and forward over the goods with a scrubbing action, and such action, combined with the spray of soapsuds or cleaning compound, results in a complete eradication of grease spots and the like.

The device can be advantageously used as an insect exterminator, by filling the container 1 with a suitable liquid or powdered poison which is readily blown into the cracks and crevices, when the air is allowed to discharge from the pipe 5.

My improved apparatus is simple in construction and operation, very compact, and by utilizing compressed air, the liquid or powdered disinfectant or cleaning compound is forcibly discharged in the form of spray at the point desired.

The valve 8 is conveniently located to the hand of the operator, and by its manipulation, the discharge of compressed air through the pipe 5 is accurately regulated; and by adjusting the valve 13, the discharge of liquid or powder through the container 1 is regulated.

I claim:—

A combined disinfecting and grease removing apparatus, comprising a cylindrical container, plates closing the ends thereof, a tube seated in the upper ends of the plates, which tube forms a handle for the apparatus, means whereby a flexible connection is attached to one end of the tubular handle, a flattened nozzle arranged on the opposite end of the tubular handle, the orifice in which nozzle is approximately equal in area to the interior cross sectional area of the tubular handle, a self closing valve located in the tubular handle, a tube connecting the forward end of the container with the forward portion of the tubular handle, a valve located in said last mentioned tube for controlling the degree of opening of the passage therethrough, there being an air inlet aperture formed in the upper portion of the container, there being an opening formed through the rear one of the end plates, and a cap screw seated in said opening.

In testimony whereof, I have signed my name to this specification, in presence of two subscribing witnesses.

JOHN STROTHER THURMAN.

Witnesses:
   K. KENT,
   C. V. THURMAN.